Patented Apr. 5, 1927.

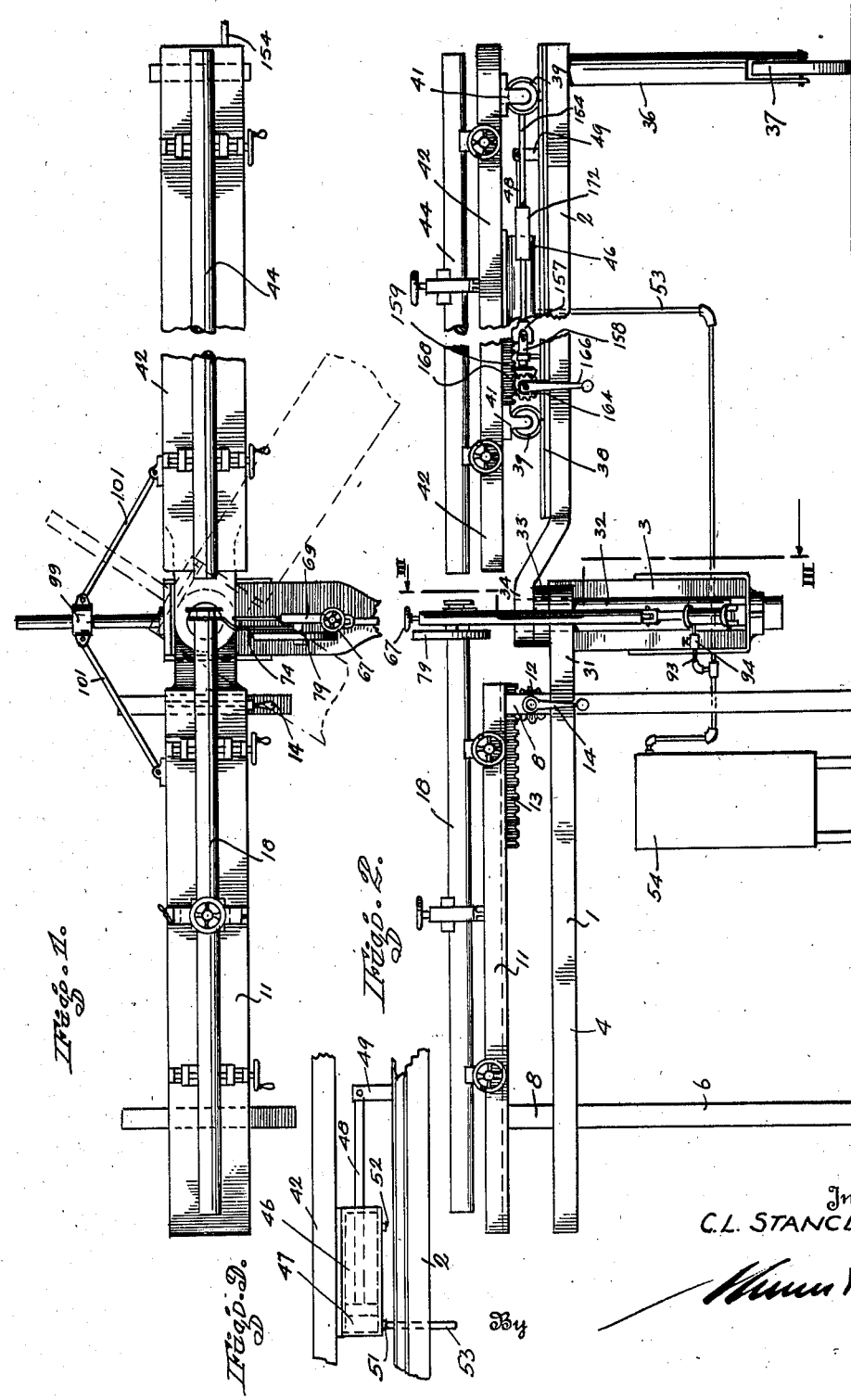

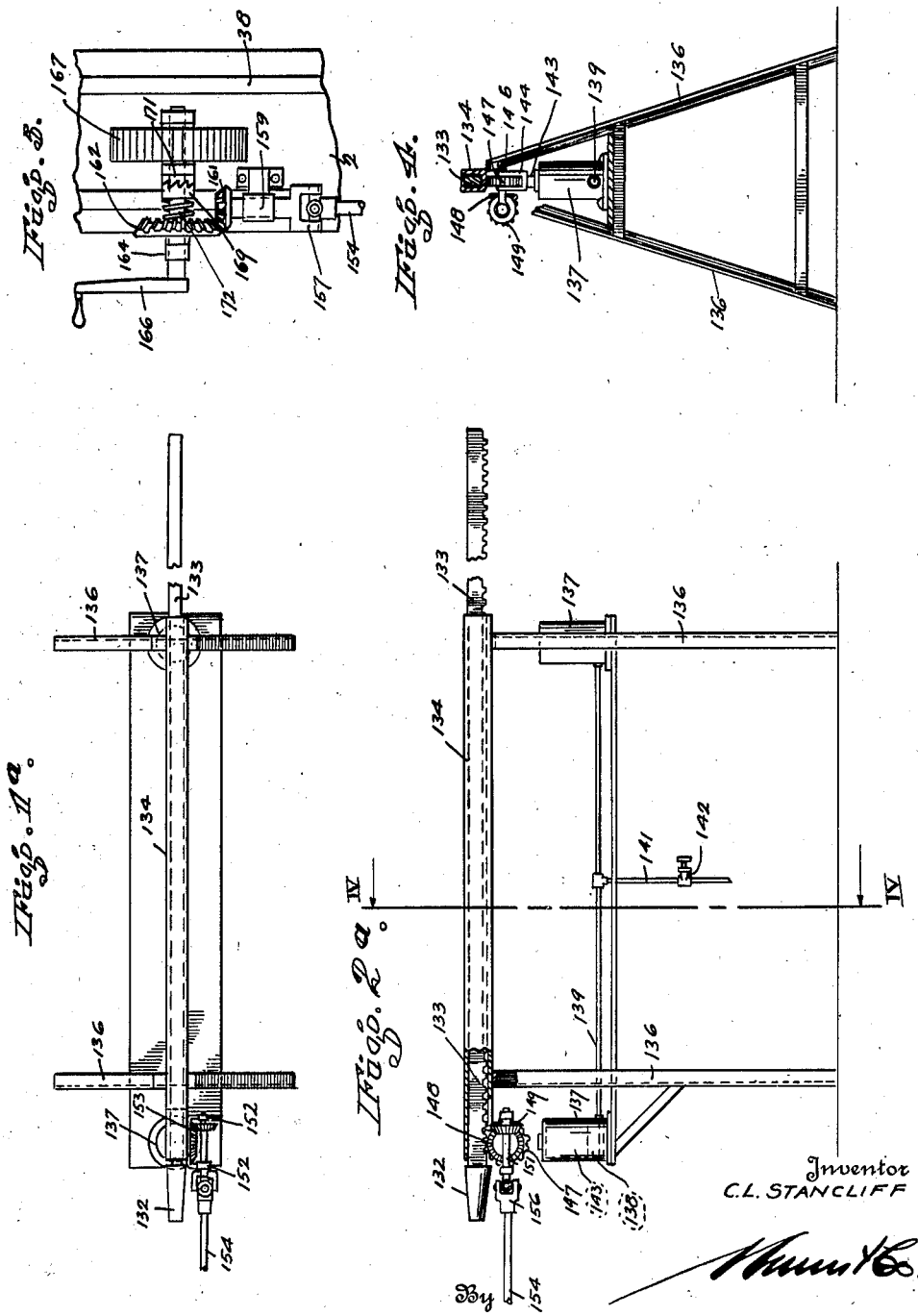

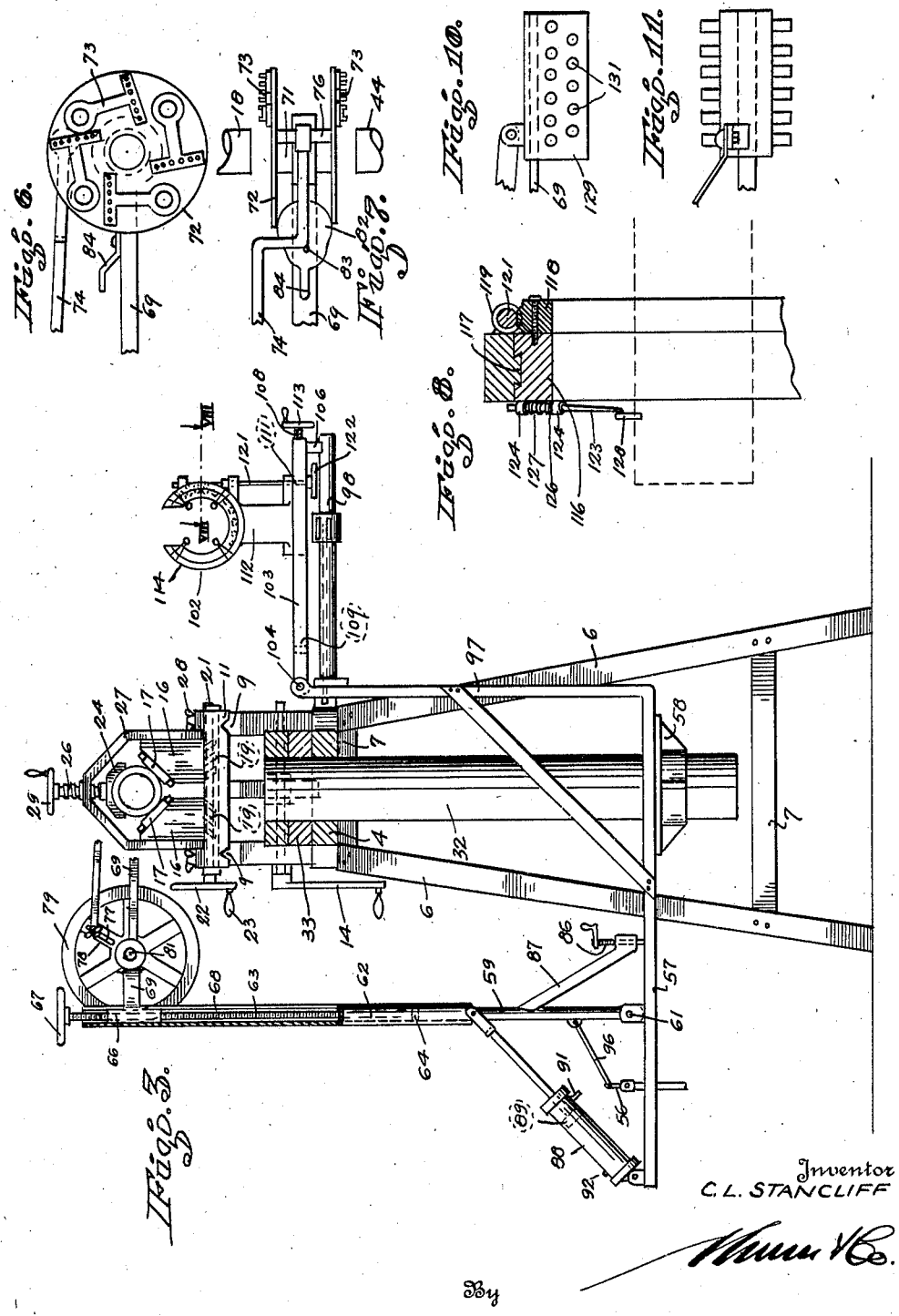

1,623,503

UNITED STATES PATENT OFFICE.

CLIFTON L. STANCLIFF, OF BAKERSFIELD, CALIFORNIA.

TORCH MECHANISM FOR WELDING MACHINES.

Original application filed May 17, 1923, Serial No. 639,685. Divided and this application filed February 23, 1926. Serial No. 90,218.

This invention relates to torch mechanism for welding machines and is shown and described in my co-pending application, Serial No. 639,685, filed May 17, 1923, and entitled Welding machine, of which this application is a division.

The preferred form of the invention is illustrated in the accompanying drawings, in which:

Figures 1 and 1ª show a top plan view of a welding machine embodying my present invention;

Figures 2 and 2ª a side view of the same;

Figure 3 a vertical section taken along line III—III of Figure 2;

Figure 4 a vertical section taken along line IV—IV of Figure 2ª;

Figure 5 an enlarged detail view in plan of an actuating mechanism for a plunger;

Figure 6 a detail view in side elevation of a torch arrangement for heating the elements to be welded;

Figure 7 a plan view of the same;

Figure 8 an enlarged sectional detail view taken along line VIII—VIII of Figure 3;

Figure 9 an enlarged detail view of a mechanism adapted to plunge one of the tables supporting one of the elements forward;

Figure 10 a detail view of a torch arrangement adapted to be used where flat bars of metal are to be welded; and Figure 11 a plan view of the latter device.

While I have shown only the preferred form of the invention, it should be understood that various changes or modifications may be made within the scope of the claims hereto attached without departing from the spirit of the invention.

The principal parts of the apparatus shown are a stationary table 1, a revolving table 2, and a revolving torch arrangement 3. The stationary table 1 consists of a plate 4 supported in any suitable manner on legs 6 secured to one another by means of horizontal braces 7. From the plate rise in spaced relation two pairs of standards 8, each standard terminating in a V-shaped upper end 9 adapted to engage similarly shaped grooves of a plate 11 and to support the latter with freedom of longitudinally sliding motion. The latter motion may be imparted to the plate 11 by means of a gear wheel 12 supported in one pair of standards and engaging a rack 13 disposed on the lower face of the plate, a crank handle 14 allowing the operator to rotate the gear wheel 12. The upper plate 11 has a vise arrangement which may be described as follows: It supports on blocks 16 two pairs of rollers 17 adapted to form a pad for one of the elements to be welded which in this case is the tube 18. The blocks 16 are mounted on the plate 11 with freedom of sliding motion in a transverse direction so that their spacing may be changed. For the latter purpose the two blocks of each pair are provided with perforated downward projections 19 adapted to be threadedly engaged by a rod 21 which latter may be rotated by means of a hand wheel 22 and the handle 23 thereon. The threads engaging the two projections of one pair of blocks run in the opposite direction so that a rotary motion of the rod 21 will force the two blocks 16 either together or apart. This arrangement allows the position of the rollers 17 to be adjusted so that they may conveniently accommodate any size of pipe within the range of the machine. To hold the pipe, I provide a block 24 adapted to be lowered and raised by means of a threaded member 26 engaging a yoke 27 secured to the plate by means of studs and wing nuts 28. It will be seen that when the threaded member 26 is turned to the right by means of the hand wheel 29, the block 24 is forced upon the pipe and firmly holds the same in position.

The table 1 projects beyond its supporting frame to form an extension 31 which is perforated near its end and adapted to receive a vertical shaft 32 provided with a collar 33 adapted to rest on the extension 31. One end 34 of the second table 2 is pivoted to the upper end of the shaft 32 and rests on the collar 33. The other end of the table 2, which latter is disposed with its main portion in the same plane as the table 1, has a leg 36 extending downwardly therefrom, which latter leg is supported on a wheel 37 allowing the far end of the table 2 to be swung in either direction around the shaft 32. The table 2, previously referred to as the revolving table, has a track 38 thereon on which wheels 39 supporting through the bearings 41 a platform 42 are adapted to travel. The platform 42 has a vise arrangement thereon for supporting the pipe 44, which corresponds in every way to the vise arrangement described in connection with the plate 11. Normally the truck formed by the platform 42 and the wheels 39 is in the position indicated in Figure 2 with the pipe 44 disposed sufficiently far from the pipe 18 to allow of the introduction of the torch arrangement, to be described hereinafter. The truck may be pushed forward with great rapidity by means of the arrangement shown in detail in Figure 9, and comprising a cylinder 46 rigidly secured to the lower face of the platform 42 and a piston 47 adapted to reciprocate therein. The piston is connected by means of the rod 48 to a standard 49 rising from the table 2, which arrangement prevents the piston from moving. If compressed air is forced between the end of the cylinder and the piston, the truck, therefore, has to move to the left. The intake 51 for the compressed air is provided at the left hand end of the cylinder while the exhaust 52 is near the right hand end but a certain distance away from the same so as to allow the air disposed rearwardly of the exhaust to form a cushion for the piston.

The intake for the cylinder connects with a tube 53 leading to a source of compressed air 54 and controlled by means of a suitable valve 56.

The third principal part of the apparatus is the torch arrangement 3. The latter is supported on a platform 57 pivoted to the vertical shaft 32 and resting on a collar 58. A rod 59 is pivoted to this platform as shown at 61 and terminates at its upper end in a tubular member 62 into which extends a threaded rod 63 held against longitudinal motion by means of a collar 64. A sleeve 66 threadedly engages the rod, which latter may be turned by means of a hand wheel 67 and is adapted to be slid upwardly or downwardly by rotating the rod 63. The sleeve has an arm 69 extending therefrom passing through a slot 68 in the tubular member 62 and supporting at its end the torch arrangement shown in detail in Figures 6 and 7, and comprising a short shaft 71 having a disc 72 at either end. Each disc has pivoted at its outer face a plurality of torches 73 which may be of any suitable type, as for instance acetylene torches. The discs may be set into oscillatory motion by means of the connecting rod 74 engaging at one end a transverse pin 76 connecting the two discs and at the other end a slot 77 in one of the spokes 78 of a wheel 79 supported on a short shaft 81 extending from the arm 69. When the face of one of the pipes is heated more intensely than the other face the operator may slide the torches away from the said pipe into closer proximity to the other pipe by means of the member 82 pivoted to the arm 69 as shown at 83. It will be noticed that when the operator turns the handle 84 of this member to the right the torches will be shifted to the left, while when the operator turns the handle to the left the torches will be shifted to the right.

Normally the support 59 for the torch arrangement is in a substantially vertical position as shown in Figure 3, and when thus disposed the torches are in their operative position, that is between the two confronting faces of the two members to be welded. The exact position desired, which changes somewhat with the size of the pipes to be welded, may be adjusted by means of the set screws 86 passing through a brace 87 extending downwardly from the rod 59 and lifting the brace from the platform 57 when turned far enough.

To quickly withdraw the torch arrangement from its operative position I use the arrangement shown in Figure 3 comprising a cylinder 88 having a piston 89 reciprocating therein and an inlet 91 for compressed air. An exhaust 92 near the other end of the clyinder allows the compressed air to leave the cylinder but is disposed a certain distance away from the end of the cylinder so as to allow of the formation of an air cushion. The intake 91 connects with the tube 93, which latter is controlled by means of a valve 94. It will thus be seen that when the valve 94 is opened the torch arrangement will be thrown out of its operative position immediately. At the same time a link 96 pivotally connecting the lower end of the rod 59 with the handle of the valve 56 operates the latter valve so as to open the same and, since this valve, as previously stated, controls the supply of fluid in the tube 53 communicating with the cylinder 46, it will be understood that the withdrawal of the torch arrangement is automatically followed by an immediate jumping forward of the truck 42.

It has been noted that the table 2 is adapted to revolve on the shaft 32. If two pipes of the character described are to be joined at an angle of ninety degrees, the table 2 can be swung around sufficiently far to form an angle of ninety degrees with the table 1. But the execution of this movement calls for a corresponding motion of the support for the torch arrangement, which latter to remain operative should be turned an angle of forty-five degrees. To cause a corresponding motion of the torch arrangement support I extend the platform 57 beyond the shaft 32, turn it upwardly as shown at 97, and upon reaching the elevation of the two tables terminates in a horizontal shaft 98 supporting a slide 99 connected by means of rods 101 to the two tables 1 and 2. Since the two rods 101 are of equal length the angle formed by the shaft 98 and the platform 57 with the two tables must always be equal so that the platform 57 always lies on the center line of the angle formed between the two tables.

A second torch arrangement 102 is supported on the opposite side of the two tables. A tubular member 103 is pivoted to the vertical extension 97 of the platform 57 as shown at 104 and provided with a projection 106 allowing its free end to rest on the shaft 98. A threaded rod 108 within the tube is held against endwise motion by means of a collar 109 and threadedly engages a sleeve 111 from which a standard 112 rises through a slot in the tube 103. The rod 108 may be rotated by means of a handwheel 113 which allows the standard to be positioned. The standard terminates in a mutilated ring 114 adapted to engage a pipe to be cut so as to surround the same when the tube 103 is swung on its pivot 104 into a vertical position. An internal mutilated ring 116 slidably engages the ring 114 by means of the dove-tailed arrangement 117 shown in Figure 8 and the latter ring has a worm gear 118 fixed thereto, which latter is adapted to be rotated by means of the worm 119 on the shaft 121 adapted to be actuated by means of the handwheel 122. It will be seen that by oscillating the handwheel 122 the internal mutilated ring 116 can be oscillated so that a plurality of torches 123 extending inwardly from the ring 116 travel around the pipe so as to cut the same. Each torch is slidably supported in two perforated lugs 124 extending from the ring 116 with a collar 126 resting on the lower lug and a spring 127 exerting centerwise pressure on the collar 126. Near its end each torch 123 is provided with a wheel 128 adapted to ride on the pipe and to hold the end of the torch at a certain distance from the pipe.

A modified form of torch arrangement is shown in Figures 10 and 11. This torch arrangement is designed to be used where solid metal plates or similar shapes are to be welded. It differs from the welding torch arrangement previously described in so far that the arm 69' intsead of supporting a disc element, as shown in Figures 6 and 7, has a rectangular block 129 slidable thereon with torches 131 extending laterally therefrom in both directions. The member 74, used in Figure 6 for oscillating the discs 72, is used in a modified arrangement to push the block 129 back and forth. Otherwise the modified form does not distinguish from the form shown in Figures 6 and 7.

The operation of the device thus far described is as follows: If two pieces of pipe are to be welded, one of the pieces 18 is placed in the vise arrangement on the stationary table 1 in such a manner that its end to be welded extends to the center line of the shaft 32. The second piece 44 is then placed in the vise on the revolving table with its inner end in confronting relation to the inner end of the pipe 18. The torch arrangement shown in Figure 3 is then placed so that the torches 73 secured to the discs 72 confront the two ends of the pipes to be welded. The torches are then lit and the wheel 79 is rotated, which causes the discs 72 to oscillate so that the end faces of the two pipes are heated evenly. If the operator should notice that one pipe is getting hotter than the other one he may shift the discs 72 by means of the member 82 so as to bring the torch arrangement closer to the other pipe. After the pipes have reached the temperature necessary for the welding operation, the operator opens the valve 94 which allows air to enter into the cylinder 88 through the intake 91 so as to push the piston 89 downwardly and to withdraw the torch arrangement. During this operation the link 96 secured to the rod 59 opens the valve 56, which allows air to enter the cylinder 46 through the intake 51. Since the piston 47 within the cylinder is stationary, the cylinder is forced to the left and takes the truck 42 along with it so as to force the pipe 44 in operative contact with the pipe 18, which completes the welding operation. It should be remembered that the main object of the invention is to secure immediate action for the advancing of the pipe 44 upon the withdrawal of the torch arrangement, and it will be readily seen that this immediate action is secured in the present invention through the fact that the torch arrangement during its withdrawal operates the valve, which starts the advancing operation for the pipe 44.

If it is desired to weld two pipes which are cut at an angle, the first pipe is secured in the vise arrangement of the stationary table so that the vertical center line of its end face is the same as the center line of the shaft 32. The other pipe is secured in the vise arrangement on the revolving table and the latter table is revolved on its hinge, that is, the shaft 32, until the two end faces to be welded are parallel. The revolving of the second table also causes the torch arrangement to revolve so that the latter always occupies a central position relative to the two tables. The torch arrangement may now be adjusted so as to face the two ends of the two pipes to be welded and heat may then be applied. After the heat rises to a desired point the valve 94 is opened which causes the withdrawal of the torch arrangement and immediately thereafter the advancing of the truck on the revolving table, which pushes the second pipe in operative contact with the first pipe, whereby the welding operation is completed. The substitution of a solid plate for the pipe does not in any way affect the operation, except that preferably the torch arrangement shown in Figures 10 and 11 is used.

To cut a pipe the torch arrangement shown on the right hand side of Figure 3 is used, that is the pipe is secured in its place on the stationary table, and if desired on the revolving table. The torch arrangement is swung in place so that the wheels 128 ride on the pipe. The torches are then lit, the handwheel 122 rotated back and forth whereby the torch arrangement is slowly oscillated so as to burn through the pipe, and to thereby cut the same.

If it is desired to cut the pipe at an angle the revolving table is revolved on the shaft 32 until the torch arrangement reaches the desired angle whereupon the operation may be performed.

If it should become necessary to provide means preventing the formation of a burr at the joint, the device shown in Figures 1ᵃ and 2ᵃ may be used. It comprises a plunger 132 at the end of a rack bar 133 slidably supported in a guide member 134. The latter is normally supported on two frames 136 at an elevation lower than the pipe 44 when the latter is in place so as to not interfere with the proper placing of the pipe 44. The guide member 134 is adapted to be lifted by means of the two cylinders 137 having pistons 138 reciprocating therein, which latter pistons are adapted to be raised by means of compressed air admitted through the tubes 139 and 141 controlled by the valve 142. The rod 143 extending from the piston 138 is forked as shown at 144, Figure 4, and supports on a pin 146 a gear wheel 147 meshing with the rack rod 133 for advancing the same. The pin 146 also supports a beveled gear 148 meshing with a beveled gear 149 on a longitudinal shaft 151 supported in bearings 152 in the arms of a U-shaped member 153 supported on the pin 146. The shaft 151 connects with a long shaft 154 through a universal joint 156, and the latter shaft extends forwardly and connects through a second universal joint 157 with a short shaft 158 supported in a bearing 159. The short shaft terminates in a beveled gear 161 (see Figure 5) meshing with a beveled gear 162 supported on the shaft 163 supported on the standard 164.

The shaft 163 may be rotated by means of a handle 166. It will be noted that if the shaft 163 is rotated counter-clockwise it will rotate the shaft 158 clockwise as viewed from the left hand side of Figure 5, and the shafts 154 and 151 in the same direction with the result that the bevel gear 149 turns the bevel gear 148 counter-clockwise and through the action of the gear wheel 147 advances the rack rod 133 having the plunger 132 secured thereto. After the two pipes 18 and 44 have been positioned the guide member 134 is raised by opening the valve 142 and allowing compressed air to enter into the cylinders 137 below the piston 138. After perfect axial alinement of the plunger 132 and the pipe 44 has been obtained, the handle 166 is rotated counter-clockwise, which pushes the plunger 132 forward into the pipe 44. This operation is continued until the plunger nearly reaches the inner end of the pipe 44.

The shaft 163 as shown in Figure 5 has a gear wheel 167 loosely supported thereon, which gear wheel meshes with a rack 168 secured to the lower face of the platform 42. Two ratchets 169 and 171, the former one of which is carried on the shaft 163, while the latter is fixed to the gear 166, engage one another in such a manner that when the shaft 163 is turned counter-clockwise by means of the handle the gear wheel 166 is not affected because a spring 172 allows the ratchet 169 to become disengaged from the other ratchet. When, however, the gear wheel 166 is turned counter-clockwise the ratchet 171 engages the ratchet 169 and causes the same to rotate in the same manner and the same direction as if it were manipulated by the handle 166. When the platform 42 or the truck supporting the same plunges forward for the purpose of throwing the pipe 44 in operative contact with the pipe 18, the gear wheel 166 is turned counter-clockwise by the rack 168 and turning the shaft 163 and through the same the longitudinal shafts 158, 154 and 151, causes the plunger 132 to advance into the joint between the two pipes thereby preventing the forming of a burr. The gear ratio of this transmission should be such that the plunger advances at about twice the speed of the truck carrying the pipe 44, since the truck itself moves and the plunger has to move faster to reach the joint in time to assist in the welding operation.

Since the plunger, as at present designed, could not be used when two pipes are to be joined at an angle, it has to be disconnected for the latter operation, and for this purpose is broken as shown at 172 with a sleeve 173 adapted to be pushed over the break in the shaft. Where the sleeve engages the shaft the latter, of course, should be angular in cross section.

I claim:

1. In a device of the character described, a torch arrangement adapted to be introduced between two elements disposed in confronting relation, comprising an arm having a shaft supported therein, a disc supported at each end of the shaft and torch elements supported on the outside of the discs for heating the confronting faces of the first two elements.

2. In a device of the character described, a torch arrangement adapted to be introduced between two elements disposed in confronting relation, comprising an arm having a shaft supported therein, a disc supported at each end of the shaft, charge admitting tubes pivoted to the outside of the discs having means associated therewith for adjusting their position, and torch elements supported on the free ends of the tubes for heating the confronting faces of the first two elements.

3. In a device of the character described, a torch arrangement adapted to be introduced between two elements disposed in confronting relation, comprising an arm having a shaft slidable thereon, a disc supported at each end of the shaft, torch elements supported on the outside of the discs for heating the confronting faces of the first two elements and means for shifting the shaft on the arm whereby the relative distance of the torch elements to the faces to be heated may be adjusted.

CLIFTON L. STANCLIFF.